United States Patent
Kawasaki et al.

(10) Patent No.: US 6,502,546 B2
(45) Date of Patent: Jan. 7, 2003

(54) INTAKE AIR CONTROL SYSTEM OF ENGINE

(75) Inventors: Takao Kawasaki, Kanagawa (JP); Masahiro Arai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/727,790

(22) Filed: Dec. 4, 2000

(65) Prior Publication Data

US 2001/0013333 A1 Aug. 16, 2001

(30) Foreign Application Priority Data

Dec. 3, 1999 (JP) ............................... 11-344215

(51) Int. Cl.$^7$ .................................. F02P 5/15
(52) U.S. Cl. .................. 123/399; 123/90.11; 123/90.15
(58) Field of Search .................. 123/322, 345–348, 123/350, 399, 90.11, 295, 90.15

(56) References Cited

U.S. PATENT DOCUMENTS

| | | | | |
|---|---|---|---|---|
| 5,022,357 A | * | 12/1989 | Kawamura | 123/90.11 |
| 6,079,387 A | * | 7/1998 | Mamiya et al. | 123/295 |
| 6,039,026 A | | 3/2000 | Shiraishi et al. | |

FOREIGN PATENT DOCUMENTS

| | | |
|---|---|---|
| DE | 198 47 851 A1 | 4/1999 |
| EP | 1 063 393 A2 | 12/2000 |
| JP | 5-71370 | 3/1993 |
| JP | 8-200025 | 8/1996 |
| JP | 10-37727 | 2/1998 |
| JP | 11-311135 | 11/1999 |

OTHER PUBLICATIONS

KAZUYUKI, "SPARK IGNITION TYPE INTERNAL COMBUSTION ENGINE," JP 55–087834, Jul. 3, 1980, *PATENT ABSTRACTS OF JAPAN* EPO Sep. 17, 1980, vol. 004, No. 132.

LENZ, et al., "Variable Valve Timing—A Possibility to Control Engine Load without Throttle," *JOURNAL OF ENGINES*, Society of Automotive Engineers, Inc., Warrendale, Pa, 1998, pp. 652–658.

* cited by examiner

Primary Examiner—Willis R. Wolfe
Assistant Examiner—Johnny H. Hoang
(74) Attorney, Agent, or Firm—Foley & Lardner

(57) ABSTRACT

A control unit controls both a motor actuated throttle valve and a magnetically actuated variable valve in accordance with an operation condition of an internal combustion engine. The control unit is configured to provide both a first control mode wherein an intake air control is carried out by controlling the open/close timing of the variable valve while keeping the throttle valve at a full-open or near full-open position and a second control mode wherein the intake air control is carried out by controlling the position of the throttle valve while reducing a controllable range of the open/close timing of the variable valve. The first and second control modes are selectively switched in accordance with the operation condition of the engine. The first and second control modes allow the engine to output the same engine torque under the same operation condition of the engine. The first and second control modes are respectively provided by calculating target intake air amounts for the first and second control modes and feeding the engine with the calculated target intake air amounts respectively.

29 Claims, 7 Drawing Sheets

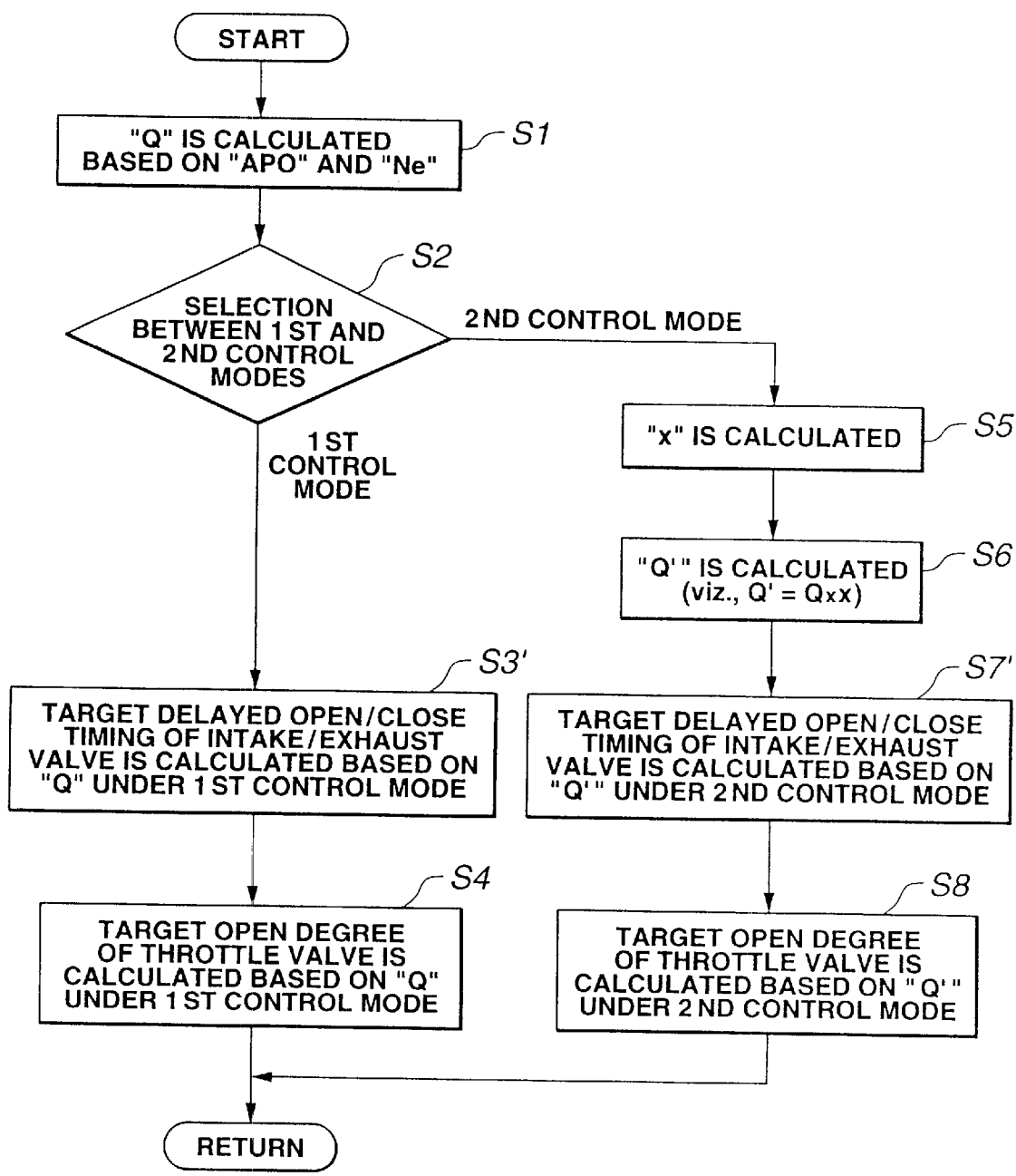

INTAKE AIR CONTROL SYSTEM OF ENGINE

BACKGROUND OF THE INVENTION

1. Field of the Invention

The present invention relates in general to intake air control systems of engines, and more particularly to intake air control systems of a type that is applied to an internal combustion engine which has both an electronically controlled throttle valve whose angular position can be freely controlled and electromagnetically actuated intake and exhaust valves (viz., variable valves) whose open/close timing can be freely controlled.

2. Description of the Prior Art

In internal combustion engines, a throttle valve has been widely used for controlling the amount of intake air directed to cylinders (viz., combustion chambers) of the engine. In these days, however, for controlling the intake air amount, usage of electromagnetically actuated intake and exhaust valves has been proposed and put into practical use in place of or in addition to the throttle valve. That is, by controlling the open/close timing of the valves, particularly, the intake valves, the amount of intake air is controlled. One of systems that embodied such idea is disclosed in Japanese Patent First Provisional Publication 8-200025.

In the engines having such system, the throttle valve is not used, or even if used, the throttle valve is auxiliarilly used for the control of intake air amount. That is, for controlling the amount of intake air, operation of the intake valves is mainly used by controlling the open/close timing of the same. Under operation of the engine with this control, the interior of the intake passage is permitted to have a slight negative pressure, which lowers a pumping loss and thus improves a net thermal efficiency of the engine.

SUMMARY OF THE INVENTION

However, due to inevitable limitation of operation speed of the electromagnetically actuated intake valves, in a high speed cruising of an associated motor vehicle, it is difficult to control the intake air amount to a desired value by using only the operation of the intake valves. In view of this, a measure may be thought out wherein in accordance with the operation condition of the engine, the intake air control is switched to a mode wherein the intake air amount is mainly controlled by the throttle valve while reducing a controllable range of the open/close timing of the intake valves.

However, even in the above-mentioned measure, it inevitably occurs that in the certain operation condition of the engine inducing the main control by the throttle valve, throttling of the throttle valve inevitably induces a certain pumping loss of the engine, which brings about a larger lowering in engine torque than that induced by the operation of the intake valves. Thus, upon switching of the intake air control mode, undesired torque gap tends to occur which lowers the driveability of the engine.

It is therefore an object of the present invention to provide an intake air control system of an engine, which produces no torque gap or at least minimizes the same upon switching of the intake air control mode.

According to a first aspect of the present invention, there is provided an intake air control system of an engine, which comprises a throttle valve installed in an intake air passage; a variable valve incorporated with a cylinder of the engine, the variable valve being controllable to have a desired open/close timing; and a control unit which includes a mode providing section that provides a first control mode wherein an intake air control is carried out by controlling the open/close timing of the variable valve while keeping the throttle valve at a full-open or near full-open position and a second control mode wherein the intake air control is carried out by controlling the position of the throttle valve while reducing a controllable range of the open/close timing of the variable valve; an intake air amount calculation section that calculates respective target intake air amounts for the first and second control modes, the respective target intake air amounts thus calculated allowing the engine to output substantially same engine torque in the respective first and second control modes under the same operation condition of the engine; and a mode switching section that carries out a switching between the first and second control modes in accordance with an operation condition of the engine.

According to a second aspect of the present invention, there is provided an intake air control system of an engine, which comprises a throttle valve installed in an intake air passage; a variable valve incorporated with a cylinder of the engine, the variable valve being controllable to have a desired open/close timing; and a control unit that controls the throttle valve and the variable valve in accordance with an operation condition of the engine, the control unit being configured to provide both a first control mode wherein an intake air control is carried out by controlling the open/close timing of the variable valve while keeping the throttle valve at a full-open or near full-open position and a second control mode wherein the intake air control is carried out by controlling the position of the throttle valve while reducing a controllable range of the open/close timing of the variable valve, the first and second control modes being selectively switched in accordance with the operation condition of the engine, and the first and second control modes allowing the engine to output the same engine torque under the same operation condition of the engine, the first and second control modes being respectively provided by calculating respective target intake air amounts for the first and second control modes and feeding the engine with the calculated target intake air amounts respectively.

According to a third aspect of the present invention, there is provided a method for controlling an intake air amount for an internal combustion engine. The engine includes a throttle valve installed in an intake air passage and a variable valve incorporated with a cylinder of the engine and controllable to have a desired open/close timing. The method comprises providing a first control mode wherein an intake air control is carried out by controlling the open/close timing of the variable valve while keeping the throttle valve at a full-open or near full-open position and a second control mode wherein the intake air control is carried out by controlling the position of the throttle valve while reducing a controllable range of the open/close timing of the variable valve; calculating respective target intake air amounts for the first and second control modes, the respective target intake air amounts thus calculated allowing the engine to output substantially same engine torque in the respective first and second control modes under the same operation condition of the engine; and carrying out a switching between the first and second control modes in accordance with an operation condition of the engine.

BRIEF DESCRIPTION OF THE DRAWINGS

FIGS. 6, 7 and 8 are flowcharts similar to FIG. 3, but showing second, third and fourth embodiments of the present invention.

DETAILED DESCRIPTION OF THE EMBODIMENTS

Figure 1:
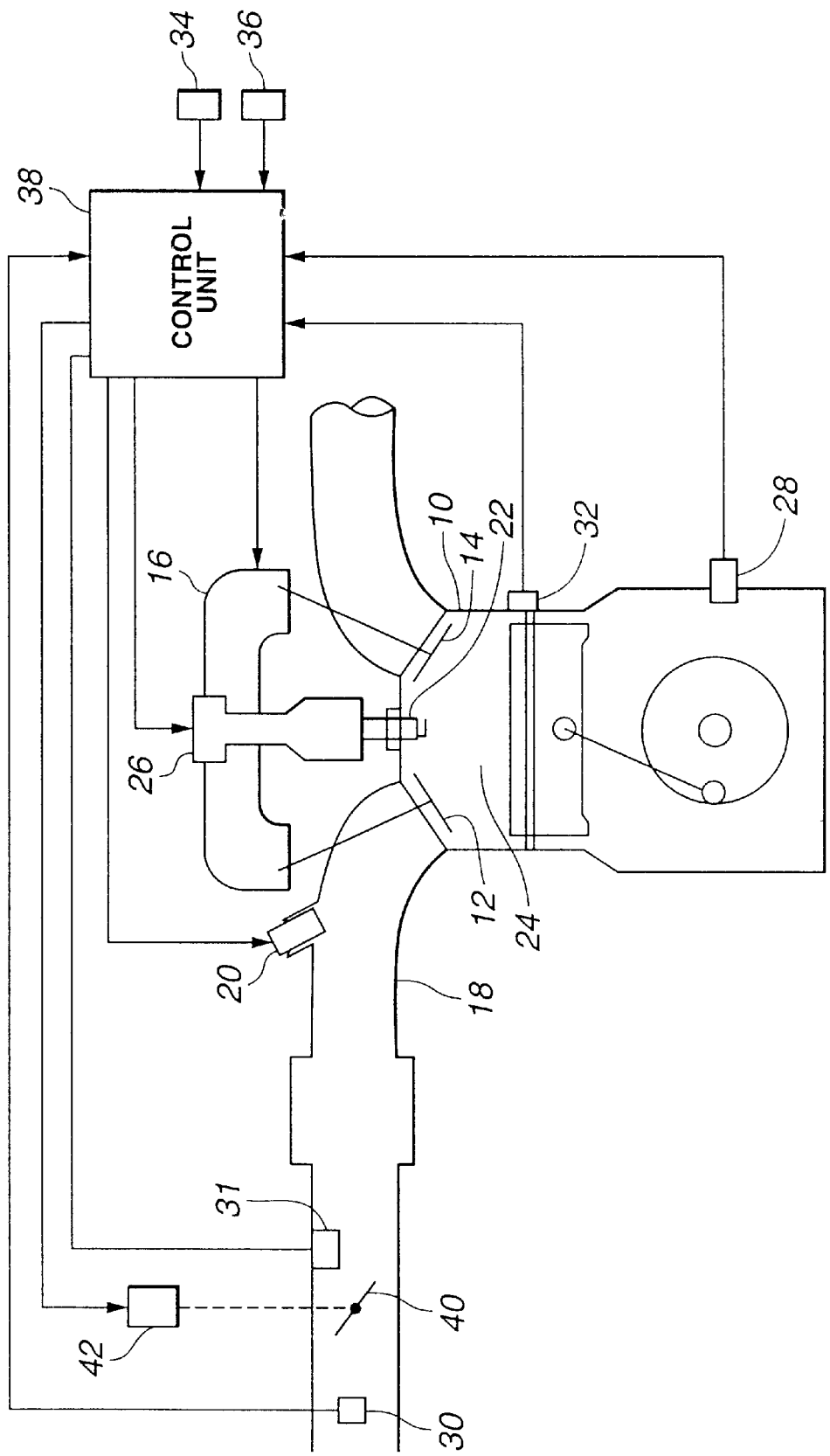
FIG. 1 is a schematic diagram of an internal combustion engine to which an intake air control system of the present invention is practically applied.

Referring to FIG. 1, there is shown a four-cycle internal combustion engine 10 operated on gasoline, to which an intake air control system of the present invention is practically applied.

Each cylinder of the engine 10 is equipped with intake and exhaust valves 12 and 14 which are controlled by an electromagnetic valve actuator 16. That is, the open/close timing of each valve 12 or 14 is controlled by the actuator 16. An intake port 18 leading to each cylinder is equipped with a fuel injector 20, and each cylinder is equipped with an ignition plug 22 which is exposed to a combustion chamber 24. The ignition plug 22 is equipped with an ignition coil 26.

A crank-angle sensor 28 is connected to the engine 10, which issues a reference signal upon sensing a reference position taken by a piston of each cylinder and issues a unit angular signal for each unit crank angle. An air flow meter 30 is mounted in an air intake passage upstream of each intake port 18, which detects the amount of air directed toward the engine 10. A negative pressure sensor 31 is mounted in the air intake passage downstream of the air flow meter 30, which detects a negative pressure created in the air intake passage. A water temperature sensor 32 is connected to the engine 10 to detect the temperature of engine cooling water. Designated by numerals 34 and 36 are an accelerator sensor and a vehicle speed sensor 36. That is, the accelerator sensor 34 detects an open degree of an accelerator (more specifically, depression degree of an accelerator pedal) and the vehicle speed sensor 36 detects the running speed of an associated motor vehicle.

Information signals from the sensors 28, 30, 31, 32, 34 and 36 are all fed to a control unit 38. By processing these information signals, the control unit 38 feeds each fuel injector 20 with an injection pulse signal to control a fuel injection amount and a fuel injection timing, feeds each ignition coil 26 with an ignition signal to control an ignition timing and feeds each electromagnetic valve actuator 16 with a valve driving signal to control the open/close timing of the intake and exhaust valves 12 and 14.

In the air intake passage at a position between the air flow meter 30 and the negative pressure sensor 31, there is installed a throttle valve 40 whose open/close pivoting is actuated by an electric motor 42. The motor 42 is controlled by a control signal issued from the control unit 38.

Figure 2:
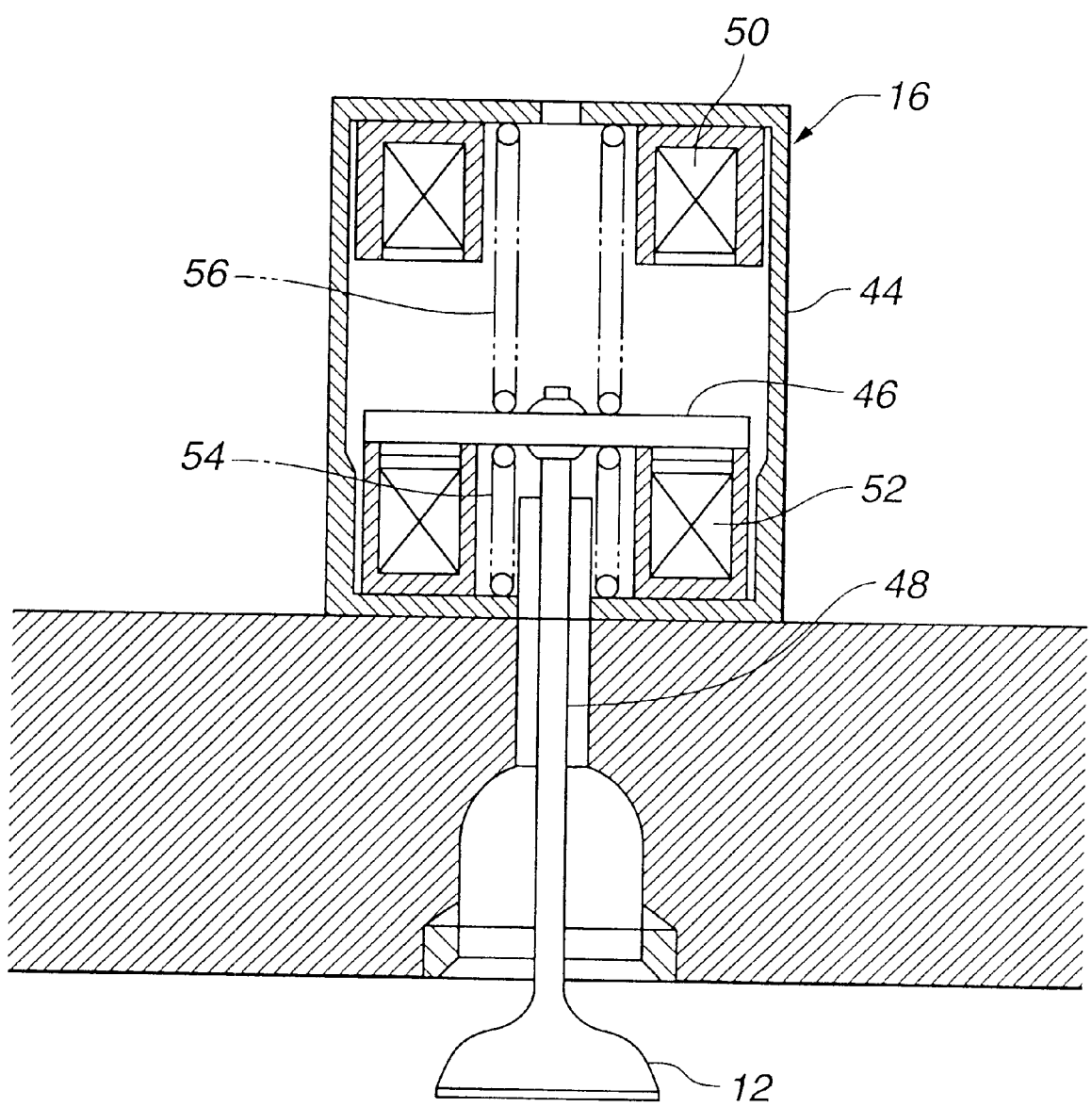
FIG. 2 is a sectional view of an electromagnetically actuated valve used in the intake air control system of the present invention.

In FIG. 2, there is shown the detail of the electromagnetic valve actuator 16. As shown, the actuator 16 comprises a housing 44 made of a non-magnetic material. An armature 46 is movably received in the housing 44, to which a valve stem 48 of the intake valve 12 (or the exhaust valve 14) is integrally connected, as shown. For ease of description, the description will be made on only the intake valve 12. A valve closing electromagnet 50 is mounted on an upper position in the housing 44, which, when electrically energized, attracts or pulls up the armature 46 to bring the intake valve 12 to its close position. A valve opening electromagnet 52 is mounted on a lower position in the housing 44, which, when electrically energized, attracts or pulls down the armature 46 to bring the intake valve 12 to its open position, as shown. A valve closing spring 54 is compressed between the armature 46 and the lower wall of the housing 44 to bias the armature 46 upward, that is, in a direction to close the intake valve 12. Furthermore, a valve opening spring 56 is compressed between the armature 46 and the upper wall of the housing 44 to bias the armature 46 downward, that is, in a direction to open the intake valve 12. The spring forces of the two springs 54 and 56 are adjusted so that when the two electromagnets 50 and 52 are both deenergized, the intake valve 12 assumes a slight open position, that is, an intermediate position between the full-open and full-close positions of the intake valve 12. When only the valve closing electromagnet 50 is energized, the intake valve 12 is brought up to the full-close position against the force of the valve opening spring 56, while, when only the valve opening electromagnet 52 is energized, the intake valve 12 is brought down to the full-open position against the force of the valve closing spring 54.

The electromagnetic valve actuator 16 actuates the intake valve 12 in such a manner that with the aid of the control unit 38 the open/close timing of the intake valve 12 takes a target value based on the operation condition of the engine 10. That is, the close timing (IVC) of each intake valve 12 is controlled in accordance with a target intake air amount (Q: viz., target amount of intake air fed to each cylinder: target torque of the engine) derived based on both the accelerator opening degree (APO) detected by the accelerator sensor 34 and the engine speed (Ne) detected by the crank-angle sensor 28. More specifically, for this control, the open timing (IVO) of the intake valve 12 is fixed in the vicinity of top dead center (TDC) of the corresponding piston, and the close timing (IVC) of the intake valve 12 is derived by looking up a map that represents a relation between the target intake air amount (Q) and the close timing (IVC). When the needed target intake air amount (Q) is small, the close timing (IVC) of the intake valve 12 is set at the side of top dead center (TDC), while when the needed target intake air amount (Q) is large, the close timing (IVC) is set at the side of bottom dead center (BDC). In the present invention, the closing timing (IVC) of the intake valve 12 is set to appear slightly earlier than the time of bottom dead center (BDC) of the piston in intake stroke. If desired, the closing timing (IVC) may be set to appear slightly later than the time of bottom dead center (BDC).

In the control for obtaining the target intake air amount, the close timing of the intake valve 12, which determines the effective intake stroke of the piston, takes a big part in determining the target intake air amount (Q). That is, the position taken by the piston upon completion of the intake stroke (or upon closing of the intake valve 12) determines the effective intake stroke of the piston. Besides, the open/close timing of the intake and exhaust valves 12 and 14, that is, the open timing (IVO) of the intake valve 12 and the close timing (EVO) of the exhaust valve 14, which determine a valve overlap rate, and the open timing (EVO) of the exhaust valve 14 which participates in the exhaust efficiency, take a larger part in determining the internal EGR (exhaust gas recirculation) rate and thus in determining the intake air amount (viz., amount of fresh air fed to each cylinder). Thus, in the invention, the control of the open/close timing of a variable valve for controlling the intake air amount includes at least a control of the close timing of the intake valve 12. However, the control of the invention may include the control of the open/close timing of the intake and exhaust valves 12 and 14.

As is described hereinabove, in the present invention, basically, by carrying out the control of the open/close timing of the variable valve, particularly by carrying out the control of advancing or retarding the close timing of the intake valve 12, the intake air amount is controlled to a target intake air amount. This control will be referred to as "first control mode" hereinafter.

However, as has been mentioned hereinbefore, this first control mode is not suitable for the low load and high speed operation of the engine. That is, by this first control mode, precise control to the target intake air amount is not obtained when the engine is under a low load and high speed condition. In fact, in this low load and high speed condition, more precise control to the target intake air amount may be achieved by controlling the throttle valve 40 in accordance with the temperature of the engine cooling water.

Accordingly, in the present invention, in such operation zone of the engine, a second control mode is adopted wherein the controllable range of the open/close timing of the intake/exhaust valve 12 or 14 is kept small and the open degree of the throttle valve 16 is freely controlled in accordance with the target intake air amount. More specifically, in the valve 12 or 14, the valve timing is fixed. That is, the open timing (IVO) of the intake valve 12 is fixed in the vicinity of top dead center (TDC) of the corresponding piston, and the close timing (IVC) of the intake valve 12 is fixed in the vicinity of bottom dead center (BDC).

It is thus to be noted that in the first control mode, the intake air amount is mainly controlled by the open/close timing of the variable valve 12 or 14, while, in the second control mode, the intake air amount is mainly controlled by the open degree of the throttle valve 40.

Upon switching between the first and second control modes, a correction control is applied to the intake air amount to suppress or at least minimize an engine torque gap which would be produced when the same intake air amount is used in either of the two control modes. In fact, under usage of the same intake air amount, the engine torque provided by the second control mode is smaller than that provided by the first control mode.

In the following, the correction control to the intake air amount, which is carried out upon switching between the first and second control modes, will be described with reference to flowcharts of the accompanying drawings.

Figure 3:
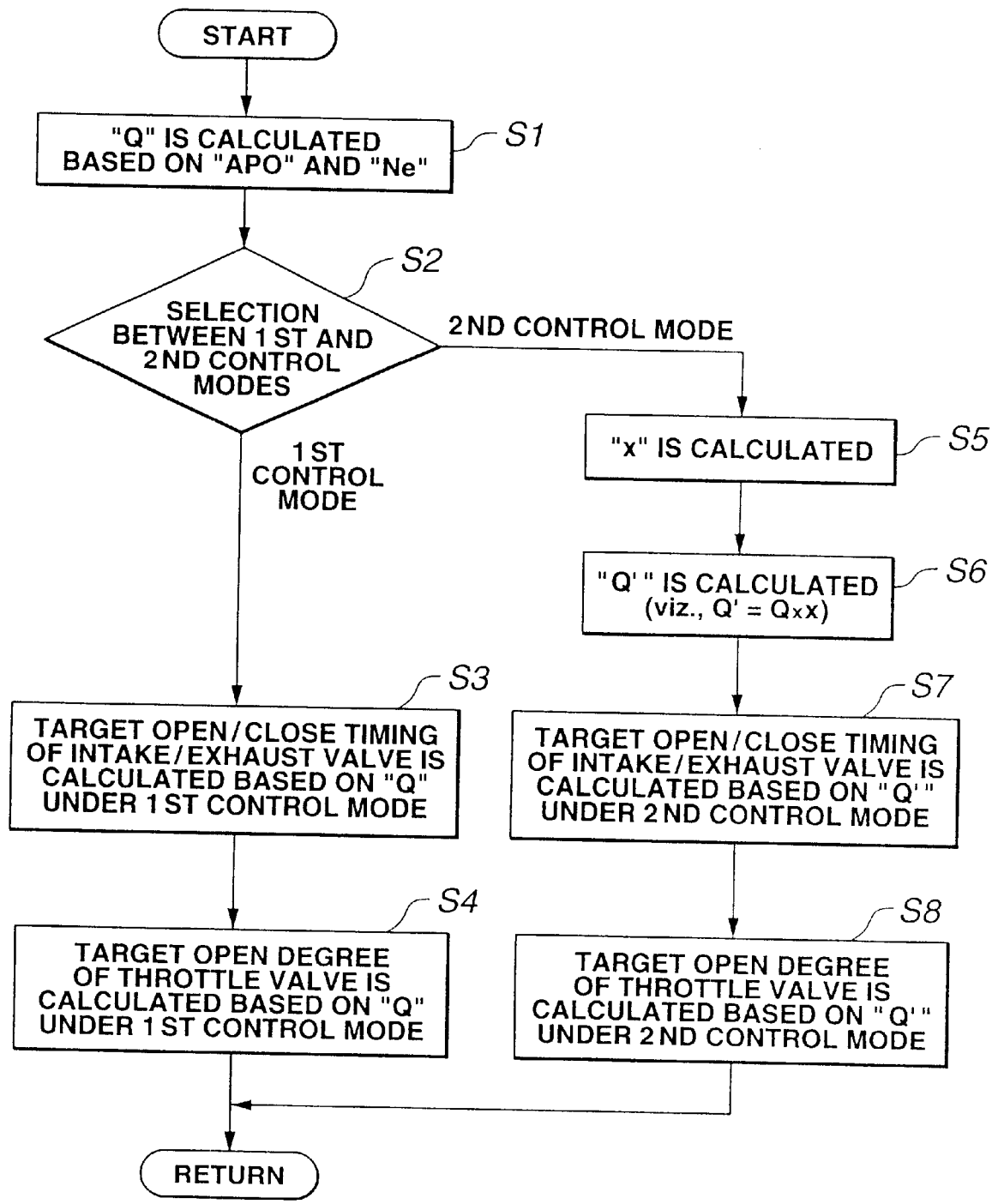
FIG. 3 is a flowchart showing operation steps executed in a control unit employed in a first embodiment of the present invention.

Referring to FIG. 3, there is shown a flowchart of operation steps adopted in a first embodiment of the present invention.

Figure 4:
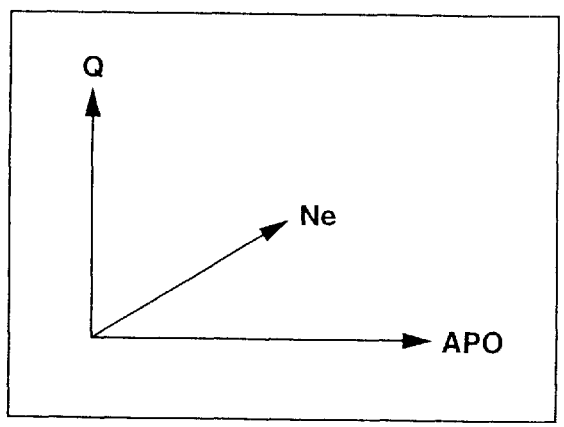
FIG. 4 is a map depicting a target intake air amount (Q) with respect to an accelerator open degree (APO) and an engine speed (Ne)

At step S1, based on the accelerator open degree (APO) and the engine speed (Ne), a target intake air amount (Q) needed for obtaining a target engine torque is calculated. In this step, the target intake air amount (Q) is directed to the amount needed by the first control mode wherein the intake air amount is controlled mainly by controlling the open/close timing of the variable valve. Specifically, the target intake air amount (Q) is derived by looking up a map of FIG. 4 that shows a relation between the accelerator open degree (APO), the engine speed (Ne) and the target intake air amount (Q).

Preferably, the target intake air amount (Q) is an amount that is derived by adding an intake air amount needed for idling the engine 10 to the above-described target intake air amount (Q).

At step S2, one of the first and second control modes is selected in accordance with an operation condition of the engine 10. That is, in a low load and high speed operation zone of the engine 10 detected based on the accelerator open degree (APO) and the engine speed (Ne), the second control mode is selected. While, in the other operation zone of the engine 10, the first control mode is selected. In this other operation zone, the above-mentioned control of the throttle valve 40 based on the temperature of the engine cooling water may be also used.

If, at step S2, the first control mode is selected, the operation step goes to step S3. At this step, a target open/close timing of the intake/exhaust valve 12 or 14 (or at least the close timing of the intake valve 12) is calculated in such a manner that the target intake air amount (Q) derived at step S1 is obtained by the first control mode, and then the open/close timing thus calculated is actually outputted to the electromagnetic valve actuator 16. Then, at step S4, a target open degree of the throttle valve 40 is calculated in such a manner the target intake air amount (Q) is obtained by the first control mode. Actually, the target open degree is calculated to correspond to a full-open position of the throttle valve 40 or a position close to the full open position. The calculated target open degree is outputted to the electric motor 42. Thus, in the first control mode, the intake air amount is controlled to the target amount (Q) by the control of the open/close timing of the intake/exhaust valve 12 or 14 keeping the throttle valve 40 at the full-open or almost full-open position.

Figure 5:
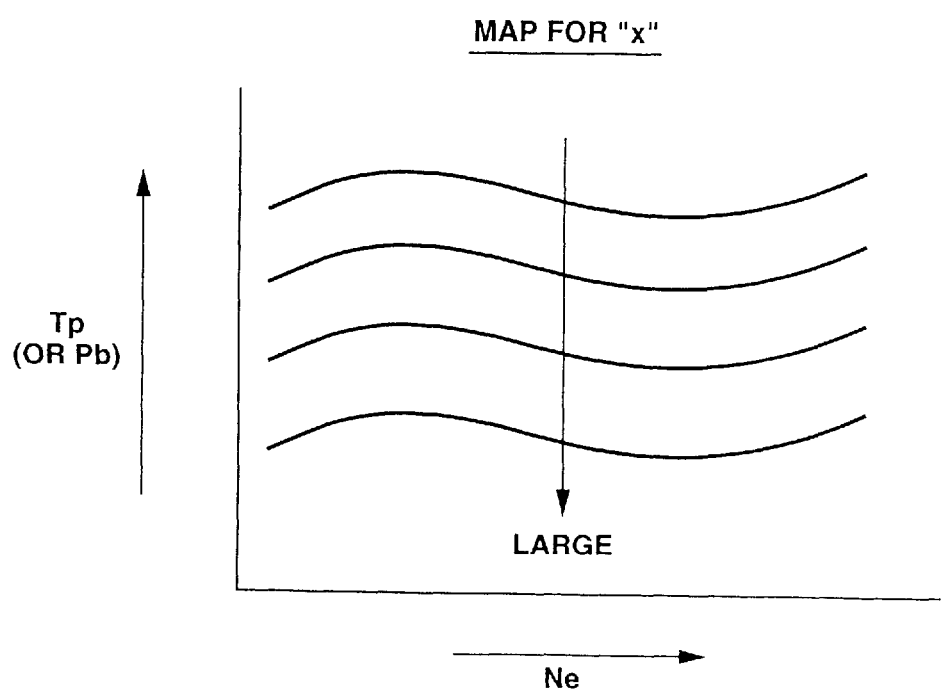
FIG. 5 is a map depicting a thermal efficiency loss compensation correction value "x" with respect to a reference fuel injection amount (Tp) and an engine speed (Ne)

While, if the second control mode is selected at step S2, the operation step goes to step S5. At this step, a thermal efficiency loss compensation correction value "x" is calculated. That is, for the reason of pumping loss, in case of the second control mode using mainly operation of the throttle valve 40, an engine torque loss becomes marked (viz., the thermal efficiency is reduced) as compared with case of the first control mode using mainly operation of the intake/exhaust valve 12 or 14. In order to compensate this thermal efficiency loss in the second control mode, the correction value "x" for compensating the thermal efficiency loss is calculated in a manner to increase the value of the target amount (Q). The pumping loss that is the largest cause of the loss of the thermal efficiency is decided by the intake pressure or the amount of intake air fed to each cylinder (which will be referred to as "cylinder intake air amount" in the following for ease of description). Thus, when an intake pressure sensor is provided or when a reference fuel injection amount (Tp) corresponding to the cylinder intake air amount is calculated separately, the correction value "x" can be approximately calculated from an intake pressure (Pb) detected by the intake pressure sensor or from the reference fuel injection amount (Tp). The intake air flow varied depending on the engine speed has an influence on the combustibility of the engine and thus on the thermal efficiency of the same. Thus, if the calculation is carried out by looking up a map as shown in FIG. 5 that provides the thermal efficiency loss compensation correction value "x" plotted using the reference fuel injection amount (Tp) (or the intake pressure (Pb)) and the engine speed (Ne) as parameters, much precise correction value "x" can be obtained.

Referring back to the flowchart of FIG. 3, at step S6, a corrected target intake air amount (Q') is obtained by multiplying "Q" and "x" together. At step S7, a target open/close timing of the intake/exhaust valve 12 or 14 is calculated in such a manner that the corrected target intake air amount (Q') is obtained by the second control mode, and then, the open/close timing thus calculated is actually outputted to the electromagnetic valve actuator 16. Then, at step S8, a target open degree of the throttle valve 40 is calculated in such a manner that the corrected target intake air amount (Q') is obtained by the second control mode, and the target open degree thus calculated is outputted to the electric motor 42. Like in a normal control for the throttle valve, the target open/close timing of the intake/exhaust valve 12 or 14 in this second control mode is set to have a value whose variable range due to change of engine operation condition is small. While, the target open degree of the throttle valve 40 in this second control mode is set to have a value whose variable range is relatively large in order that the intake air amount is mainly controlled by the throttle valve 40.

Accordingly, in the second control mode, the intake air amount is controlled to the corrected target intake air amount (Q') by controlling the open degree of the throttle valve 40 while generally fixedly controlling the open/close timing of the intake/exhaust valve 12 or 14. With this, even in this second control mode, there is obtained an engine torque that is identical to that obtained in the first control mode wherein the target intake air amount is set at "Q". Thus, even when switching between the first and second control modes takes place due to change in engine operation condition, undesired torque gap is suppressed or at least minimized.

Figure 6:
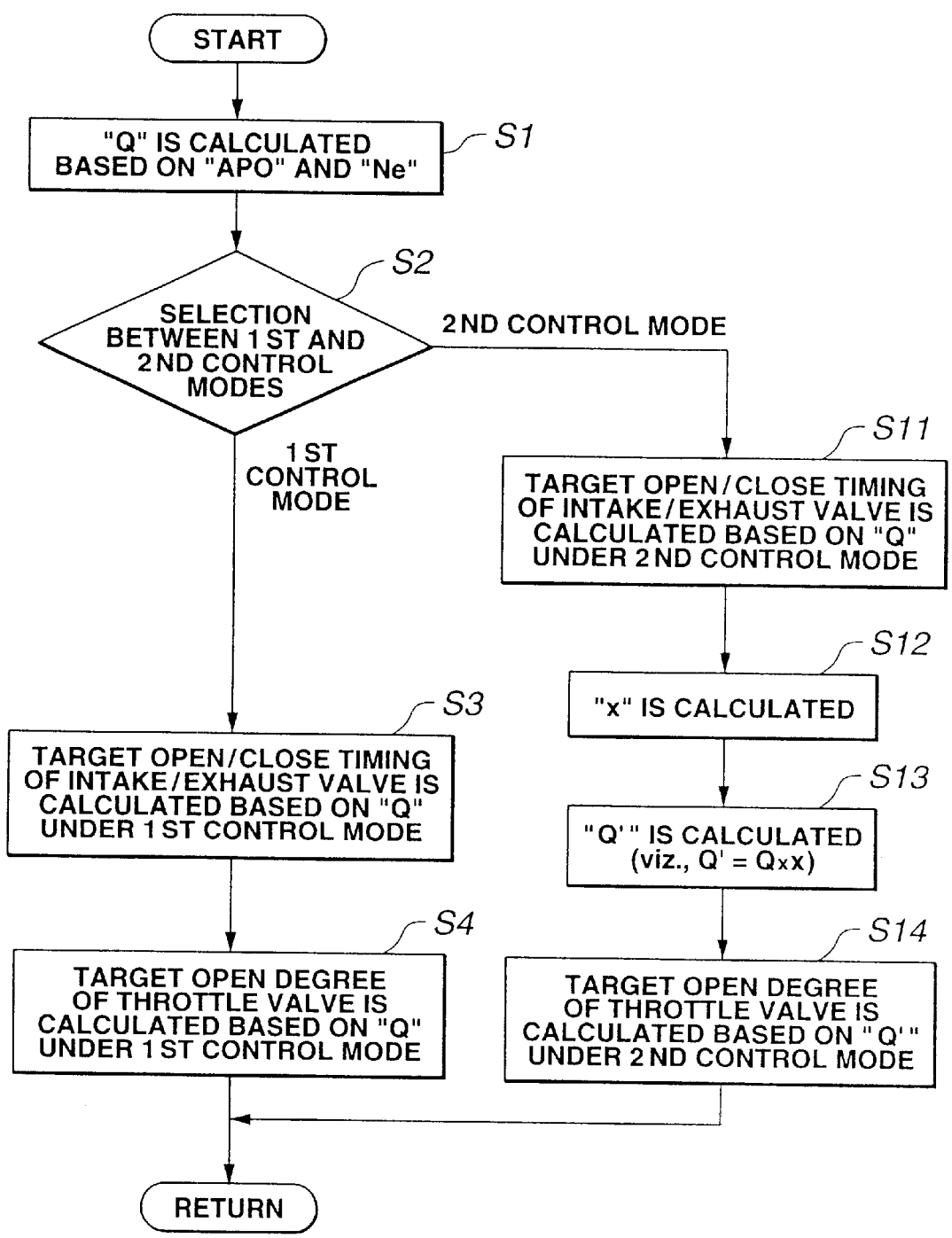

Referring to FIG. 6, there is shown a flowchart of operation steps adopted in a second embodiment of the present invention.

Since steps S1, S2, S3 and S4 are the same as those of the above-mentioned first embodiment, description of them will be omitted from the following.

If, at step S2, the second control mode is selected, the operation flow goes to step S11. At this step, a target open/close timing of the intake/exhaust valve 12 or 14 is calculated in such a manner that the target intake air amount (Q) derived at step S1 is obtained by the second control mode, and then the open/close timing thus calculated is actually outputted to the electromagnetic valve actuator 16. Then, at step S12, a thermal efficiency loss compensation correction value "x" is calculated like in the manner taken at step S5 of the above-mentioned first embodiment of FIG. 3. Then, at step S13, a corrected target intake air amount (Q') is obtained by multiplying "Q" and "x" together. Then, at step S14, a target open degree of the throttle valve 40 is calculated in such a manner that the corrected target intake air amount (Q') is obtained by the second control mode, and the target open degree thus calculated is outputted to the electric motor 42.

It is now to be noted that the calculation of the target open degree of the throttle valve 40 carried out at step S14 differs from that carried out at step S8 of the first embodiment. That is, in the second embodiment, the calculation of the target open/close timing of the intake/exhaust valve 12 or 14 is made on the non-corrected target intake air amount (Q), and an increased correction part of the corrected target intake air amount (Q') is not covered by the control of the open/close timing of the intake/exhaust valve 12 or 14 but by an increased correction part of the open degree of the throttle valve 40, and thus, the target open degree of the throttle valve 40 is calculated somewhat larger than that derived at step S8 of the first embodiment. In the second embodiment, substantially same operation as the first embodiment is obtained. However, since, in the second embodiment, correction is applied to only the open degree of the throttle valve 40, set matching is much easily made as compared with the first embodiment.

Figure 7:
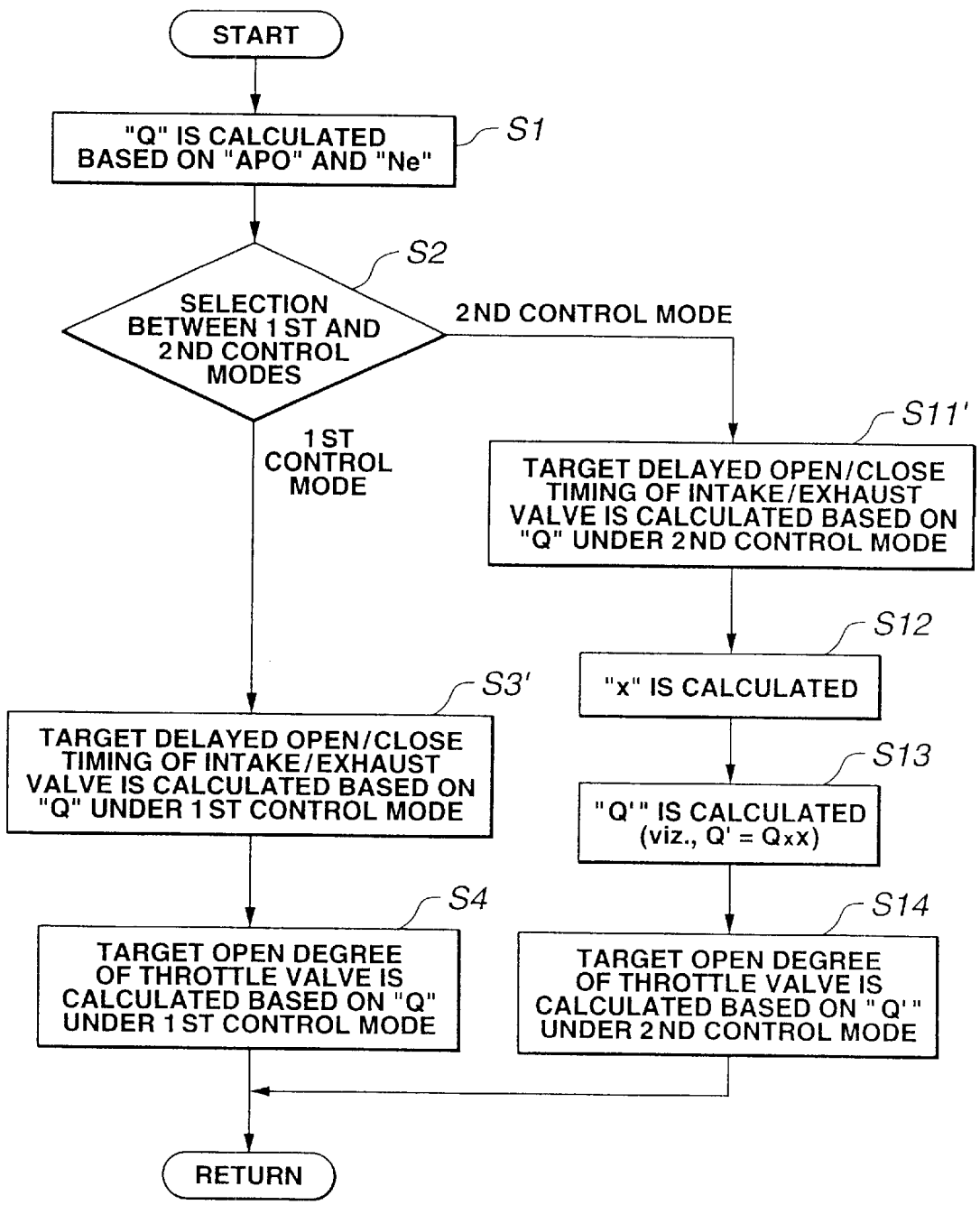

Referring to FIG. 7, there is shown a flowchart of operation steps adopted in a third embodiment of the present invention.

Since steps S1, S2, S4, S12, S13 and S14 are the same as those of the above-mentioned second embodiment of FIG. 6, explanation of them will be omitted from the following description.

In the third embodiment, upon switching from the first to second control mode and vice versa, a target value of the open/close timing of the variable valve derived after the switching is converged to a value with a delay. That is, at step S3', a delayed target open/close timing of the intake/exhaust valve 12 or 14 is calculated in such a manner that the target intake air amount (Q) is obtained by the first control mode, and the delayed target open/close timing thus calculated is actually outputted to the electromagnetic valve actuator 16. At step S11', a delayed target open/close timing of the intake/exhaust valve 12 or 14 is calculated in such a manner that the target intake air amount (Q) is obtained by the second control mode, and the delayed target open/close timing thus calculated is actually outputted to the electromagnetic valve actuator 16. For providing the open/close timing with the delay, a weighted mean calculation method is employed. The delay degree is determined according to the variation of the target open degree of the throttle valve 40. That is, with increase of the variation, the delay degree of the target open/close timing of the intake/exhaust valve 12 or 14 increases.

When switching is made from the first (or second) control mode to the second (or first) control mode, the throttle valve 40 is controlled to pivot from the almost full-open position (or controlled open position taken before the switching) to the target open position (or almost full-open position). That is, upon such switching, the throttle valve 40 is controlled to decrease (or increase) its open degree reducing (or increasing) the intake pressure. Now, in the third embodiment, in response to an inevitable delay of the reducing (or increasing) of the intake pressure, the variation to the target value of the open/close timing of the variable valve after the switching is provided with a delay, so that displacement from the target value of intake air amount actually fed to each cylinder is suppressed or at least minimized. Thus, undesired torque gap, which would be produced upon the mode switching, is assuredly suppressed or at least minimized.

Referring to FIG. 8, there is shown a flowchart of operation steps adopted in a fourth embodiment of the present invention.

Since steps S1, S2, S4, 55, S6 and S8 are the same as those of the above-mentioned first embodiment of FIG. 3, explanation of them will be omitted from the following description.

Also in the fourth embodiment, upon switching of the control mode, the target value of the open/close timing of the variable valve is converged to a value with a delay. That is, at step S3', a delayed target open/close timing of the intake/exhaust valve 12 or 14 is calculated in such a manner that the target intake air amount (Q) is obtained by the first control mode, and the delayed target open/close timing thus calculated is actually outputted to the electromagnetic valve actuator 16. At step S7', a delayed target open/close timing of the intake/exhaust valve 12 or 14 is calculated in such a manner that the target intake air amount (Q') is obtained by the second control mode, and the delayed target open/close timing thus calculated is actually outputted to the electromagnetic valve actuator 16. Due to substantially same reason as that in the third embodiment, undesired torque gap at the mode switching is assuredly suppressed or at least minimized.

The entire contents of Japanese Patent Application P11-344215 (filed Dec. 3, 1999) are incorporated herein by reference.

Although the invention has been described above with reference to embodiments of the invention, the invention is not limited to such embodiments. Various modifications and variations of the embodiments will occur to those skilled in the art, in light of the above teachings.

What is claimed is:

1. An intake air control system of an engine, comprising:
   a throttle valve installed in an intake air passage;
   a variable valve incorporated with a cylinder of the engine, said variable valve being controllable to have a desired open/close timing; and
   a control unit which includes:
      a mode providing section that provides a first control mode wherein an intake air control is carried out by controlling an open/close timing of said variable valve while keeping said throttle valve at a full-open or near full-open position and a second control mode wherein the intake air control is carried out by controlling a position of said throttle valve while reducing a controllable range of the open/close timing of said variable valve;
      an intake air amount calculation section that calculates respective target intake air amounts for the first and second control modes, the respective target intake air amounts thus calculated causing the engine to output substantially same engine torque in the first and second control modes, respectively, under a same operation condition of the engine; and
      a mode switching section that carries out a switching between said first and second control modes in accordance with an operation condition of the engine.

2. An intake air control system of an engine, comprising:
   a throttle valve installed in an intake air passage;
   a variable valve incorporated with a cylinder of the engine, said variable valve being controllable to have a desired open/close timing; and
   a control unit that controls said throttle valve and said variable valve in accordance with an operation condition of the engine, said control unit being configured to provide both a first control mode wherein an intake air control is carried out by controlling an open/close timing of said variable valve while keeping said throttle valve at a full-open or near full-open position and a second control mode wherein the intake air control is carried out by controlling the position of said throttle valve while reducing a controllable range of the open/close timing of said variable valve, said first and second control modes being selectively switched in accordance with the operation condition of the engine, and said first and second control modes causing said engine to output substantially same engine torque under a same operation condition of the engine, said first and second control modes being respectively provided by calculating respective target intake air amounts for the first and second control modes and feeding the engine with the calculated target intake air amounts respectively.

3. An intake air control system as claimed in claim 2, in which said variable valve is actuated by an electromagnetic valve actuator, said valve actuator comprising an armature connected to said valve to move therewith, a valve closing electromagnet to move the armature in a valve closing direction when energized, a valve opening electromagnet to move the armature in a valve opening direction when energized, a valve closing biasing member to bias the armature in the valve closing direction and a valve opening biasing member to bias the armature in the valve opening direction.

4. An intake air control system as claimed in claim 2, in which said control unit is configured to select said second control mode when the engine is under a low load and high speed condition, and selects said first control mode when the engine is under a condition other than said low load and high speed condition.

5. An intake air control system as claimed in claim 2, in which the target intake air amount needed for the second control mode is derived based on a basic target intake air amount and a thermal efficiency loss compensation correction value.

6. An intake air control system as claimed in claim 5, in which said basic target intake air amount is derived based on a reference amount of fuel fed to each intake port of the engine by a fuel injector.

7. An intake air control system as claimed in claim 5, in which said basic target intake air amount is derived based on an intake pressure created in said intake air passage.

8. An intake air control system as claimed in claim 5, in which said thermal efficiency loss compensation correction value is decided to increase as said basic target intake air amount reduces.

9. An intake air control system as claimed in claim 5, in which said thermal efficiency loss compensation correction value is calculated based on engine speed.

10. An intake air control system as claimed in claim 2, in which said variable valve is an intake valve and upon selection of said first control mode, the closing timing of said intake valve is set to appear earlier than a time of bottom dead center of a corresponding piston in intake stroke, and in which the closing timing of said intake valve is controlled to near the time of bottom dead center of the piston as the target intake air amount increases.

11. An intake air control system as claimed in claim 2, in which said variable valve is an intake valve and upon selection of said second control mode, the closing timing of said intake valve is fixed and the target intake air amount is controlled by controlling a position of said throttle valve.

12. An intake air control system as claimed in claim 2, in which a target open/close timing of said variable valve is calculated with a delay which increases as a variation of a target open position of said throttle valve increases.

13. In an internal combustion engine including a throttle valve installed in an intake air passage and a variable valve incorporated with a cylinder of the internal combustion engine and controllable to have a desired open/close timing,
   a method for controlling an intake air amount, comprising:
      providing a first control mode wherein an intake air control is carried out by controlling the open/close timing of said variable valve while keeping said throttle valve at a full-open or near full-open position and a second control mode wherein the intake air control is carried out by controlling the position of said throttle valve while reducing a controllable range of the open/close timing of said variable valve;

calculating respective target intake air amounts for the first and second control modes, the respective target intake air amounts thus calculated causing the engine to output substantially same engine torque in the respective first and second control modes under a same operation condition of the engine; and carrying out a switching between said first and second control modes in accordance with an operation condition of the engine.

14. An intake air control apparatus for an engine, comprising:

a throttle valve installed in an intake air passage;

an intake valve incorporated with a cylinder, the intake valve being operative at variable open/close timing; and a control unit configured to selectively provide a first control mode wherein an intake air amount fed to the cylinder is regulated by controlling an open/close timing of the intake valve and a second control mode wherein the intake air amount is regulated by controlling an opening degree of the throttle valve, in accordance with an operational condition of the engine, wherein the open/close timing of the intake valve for the first control mode being calculated based on a target intake air amount, the opening degree of the throttle valve for the second control mode being calculated based on a corrected target intake air amount, the corrected target intake air amount being calculated in a manner to increase the target intake air amount.

15. An intake air control apparatus as claimed in claim 14, wherein the opening degree of the throttle valve for the first control mode is at a full-open position or a position close to the full-open position.

16. An intake air control apparatus as claimed in claim 14, wherein the open/close timing of the intake valve for the second control mode is generally fixed.

17. An intake air control apparatus as claimed in claim 14, wherein the corrected target intake air amount is calculated based on the target intake air amount and a correction value for compensating a thermal efficiency loss.

18. An intake air control apparatus as claimed in claim 17, wherein the correction value is calculated from an intake air pressure in the intake air passage downstream of the throttle valve.

19. An intake air control apparatus as claimed in claim 17, wherein the correction value is calculated from a fuel injection amount.

20. An intake air control apparatus as claimed in claim 17, wherein the correction value is calculated from an engine speed.

21. An intake air control apparatus as claimed in claim 17, wherein the correction value is calculated to increase as the target intake air amount reduces.

22. An intake air control apparatus as claimed in claim 14, wherein the second control mode is provided under a low load and high speed condition.

23. An intake air control apparatus as claimed in claim 14, wherein the second control mode is provided under a low load and high speed condition, and the first control mode is provided under a condition other than the low load and high speed condition.

24. An intake air control apparatus as claimed in claim 14, wherein the intake valve is actuated by an electromagnetic actuator.

25. An intake air control apparatus as claimed in claim 24, wherein the electromagnetic actuator includes an armature aligned with the intake valve, a pair of springs biasing the armature, and a pair of electromagnets attracting the armature to open and close the intake valve.

26. An intake air control apparatus as claimed in claim 14, wherein a closing timing of the intake valve for the first control mode is set earlier than a bottom dead center of an intake stroke, and wherein the closing timing of the intake valve is controlled to near the bottom dead center of the intake stroke as the target intake air amount increases.

27. An intake air control apparatus as claimed in claim 14, wherein the open/close timing of the intake valve is calculated with a delay when the control mode is changed.

28. An intake air control apparatus as claimed in claim 14, wherein the open/close timing of the intake valve for the first control mode is calculated with a delay when a control mode is changed from the second control mode to the first control mode.

29. An intake air control apparatus as claimed in claim 14, wherein a degree of the delay is determined in accordance with a variation of a target opening degree of the throttle valve.

* * * * *